Figure 1:
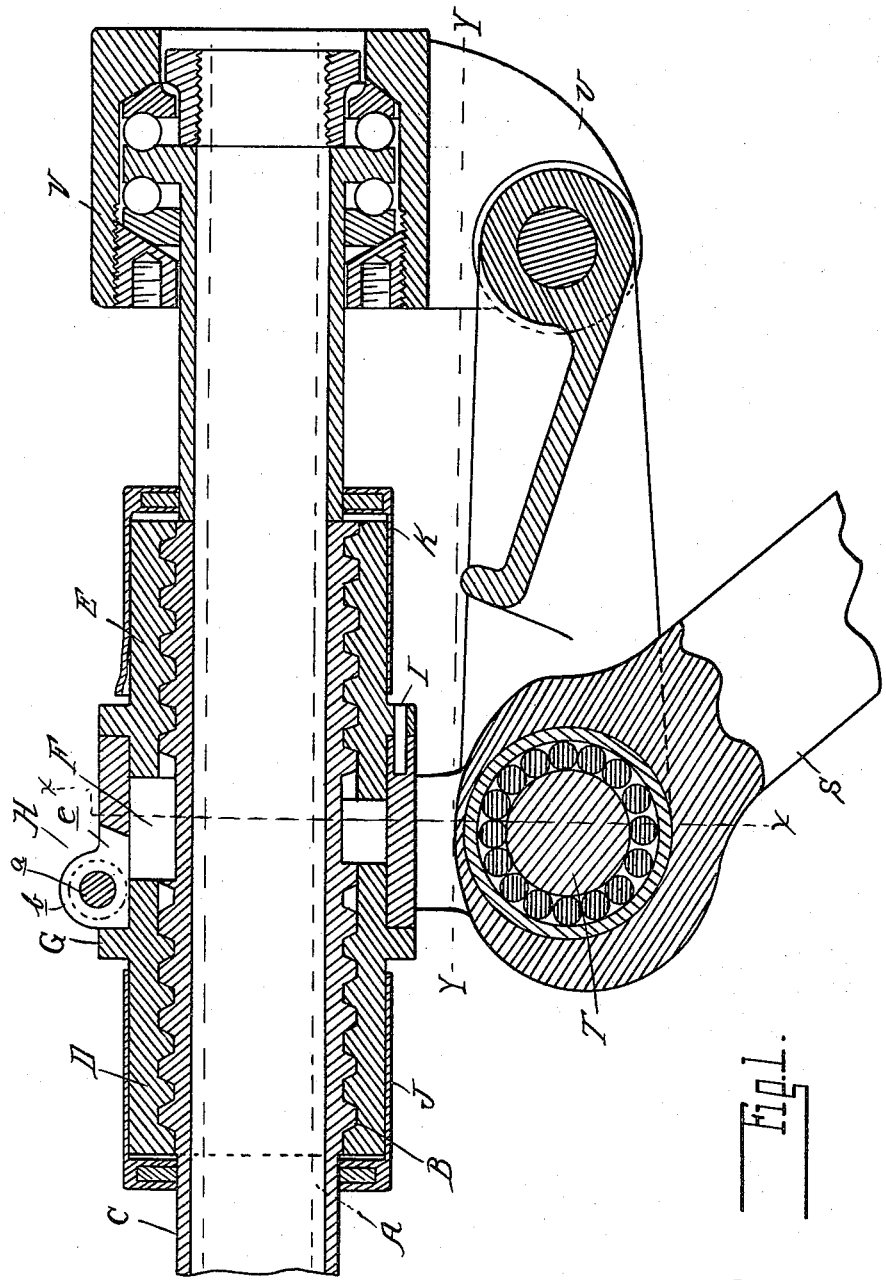

J. BOYER.
GEARING.
APPLICATION FILED DEC. 28, 1912.

1,149,333.

Patented Aug. 10, 1915.
2 SHEETS—SHEET 1.

Witnesses
W. R. Ford
James P. Barry

Inventor
Joseph Boyer
By Whittemore Hulbert & Whittemore
Attys

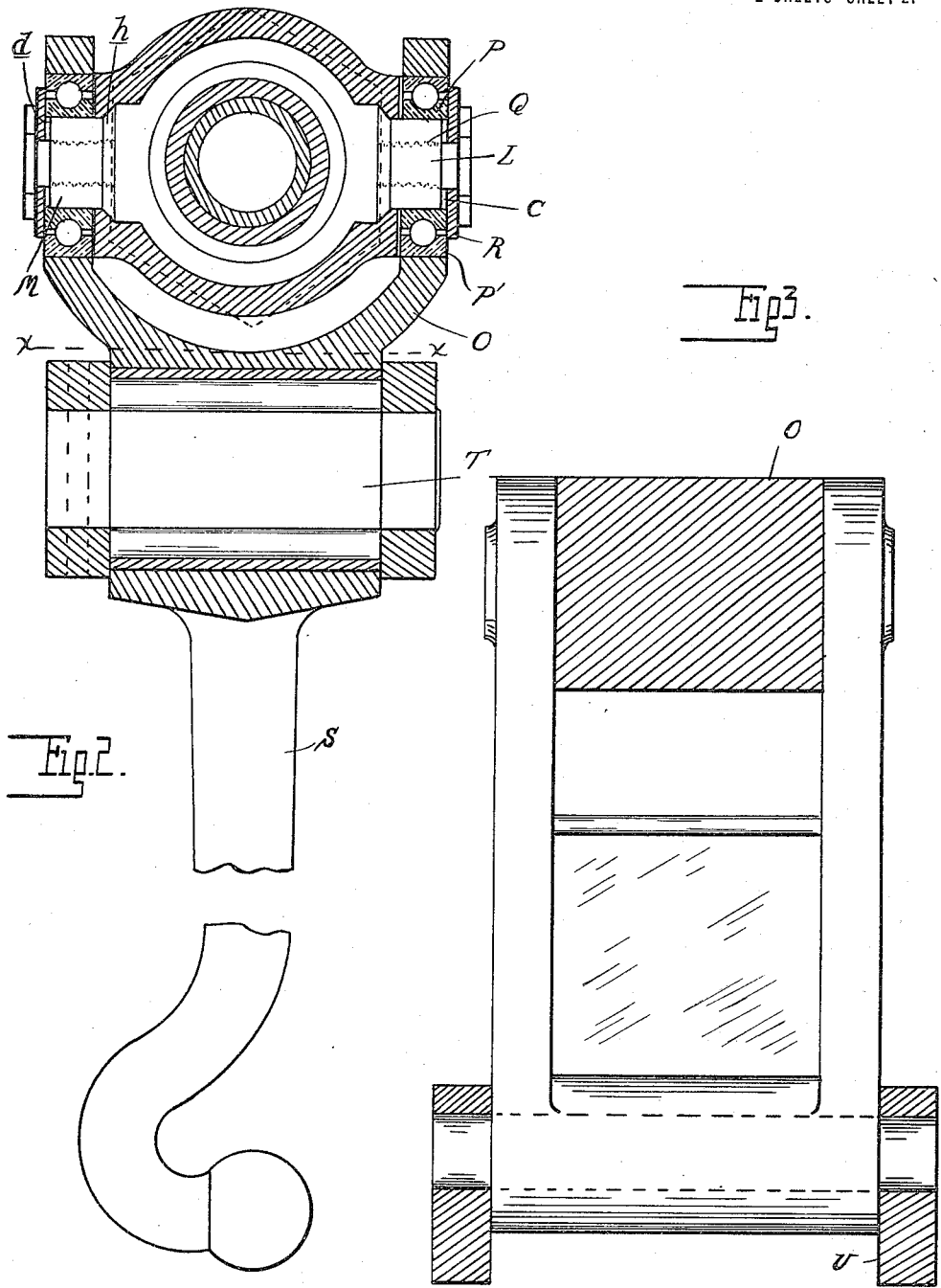

UNITED STATES PATENT OFFICE.

JOSEPH BOYER, OF DETROIT, MICHIGAN, ASSIGNOR OF ONE-HALF TO JOSEPH BOYER, JR., AND ONE-HALF TO WILLIAM A. C. MILLER, JR., BOTH OF DETROIT, MICHIGAN.

GEARING.

1,149,333. Specification of Letters Patent. Patented Aug. 10, 1915.

Application filed December 28, 1912. Serial No. 738,986.

*To all whom it may concern:*

Be it known that I, JOSEPH BOYER, a citizen of the United States of America, residing at Detroit, in the county of Wayne and State of Michigan, have invented certain new and useful Improvements in Gearing, of which the following is a specification, reference being had therein to the accompanying drawings.

The invention has particular reference to a steering gear for automobiles, and resides in the peculiar construction thereof, in novel, simple and efficient means for taking up the natural wear of the parts; and, further, in various details of construction, and in the arrangement and combination of parts, as will be more fully hereinafter set forth.

In the drawings: Figure 1 is a longitudinal sectional view through the steering mechanism; Fig. 2 is a section taken on line x—x of Fig. 1; and Fig. 3 is a section taken on line y—y Fig. 1.

In the drawings thus briefly described, A represents the main steering tube or spindle, and B the driving screw thereon, the thread of which—as herein shown—being of the same pitch throughout. Preferably, the screw is formed upon a sleeve C and the latter keyed to the stem or spindle A.

Mounted upon the screw described are two tubular elongated nuts D E, separated at their proximate ends by the space F. Each nut exteriorly is provided with an annular shoulder G, one of which is hexagonal, so it may be grasped by a wrench for turning.

H is a ring-shaped coupling surrounding the proximate portions of the two nuts, and split on one side as at e,—the clamping means therefor consisting of a bolt as a engaging suitable ears as b on opposite sides of the slit e. Preferably, a connection as I—in the form of a pin—unites one of the nut members as E to the coupling, so as to effectively prevent relative rotation between those parts.

J and K represent dust caps, which have a sliding engagement with the screw sleeve, and are of a length to extend over the elongated nuts in proximity to the shoulders.

The coupling described is formed with oppositely-disposed openings c d in its side portions, within which are adapted to be placed pins L M, having heads h, these pins being insertible from within the coupling and held by the head portions from outward movement. These pins are held in place by screws Q, the heads of which overlap and hold washers R against the bearing rings P P', which surround the pins.

The inner rings P are held from rotation on the pins L M, while the outer ring is secured to and turns with the yoke O, which has in its ends apertures to receive the rings P'. Suitable balls are interposed between the rings P P'. The yoke is formed on the end of the lever S, suitably connected by means, not shown, to the front or steering wheels, and the lever S being pivoted on the cross pivot T carried by a frame member U, adapted to be secured to the frame of the vehicle.

The lower end of the spindle A is journaled in the frame U, in a suitable bearing V adapted to permit rotary movement but to prevent endwise movement of the spindle during its rotation.

In use, the coupling couples the two nuts D E together, so that they move together as one, moving the coupling with them, and working the lever to effect the steering.

In case of wear between the threads on the nuts and those on the spindle, the clamping bolt a is turned to release the clamping action of the coupling, the nut E is held from rotation and the nut D is turned until the wear is taken up, when the bolt a is again turned to clamp the coupling on the nut D.

It will be seen that the nuts D E are in fixed longitudinal relation to each other by abutting against the shoulders G on the coupling, and the adjustment is effected by simply turning the nut D until the threads contact and take up the wear.

It will be seen that when the vehicle is moving straight ahead, the nut and screw being of the same length there is no chance for a shoulder to be worn.

What I claim as my invention is,—

1. In a steering gear of the character described, the combination with a screw, of elongated tubular nuts thereon spaced apart and formed each with a shoulder near its proximate end, a split clamping ring engaging the proximate ends of the nuts and the shoulders, a connection between said ring and one of the shoulders holding the parts against relative rotation, and means for clamping the ring to the other nut.

2. In a steering gear of the character described, the combination with a screw, of spaced elongated nuts thereon, a coupling connecting the nuts formed with oppositely-disposed openings in the side portions thereof, outwardly projecting pins within the openings, and a yoke member mounted upon the pins.

In testimony whereof I affix my signature in presence of two witnesses.

JOSEPH BOYER.

Witnesses:
  ADELAIDE I. ADAMS,
  JAMES P. BARRY.

Copies of this patent may be obtained for five cents each, by addressing the "Commissioner of Patents, Washington, D. C."